United States Patent
Stransky

(10) Patent No.: US 7,227,954 B2
(45) Date of Patent: Jun. 5, 2007

(54) SECURE DATA TRANSMISSION SYSTEM AND METHOD

(75) Inventor: Philippe Stransky, Marchissy (CH)

(73) Assignee: Nagravision S.A., Cheseaux-Sur-Lausanne (CH)

( * ) Notice: Subject to any disclaimer, the term of this patent is extended or adjusted under 35 U.S.C. 154(b) by 894 days.

(21) Appl. No.: 10/257,759

(22) PCT Filed: Apr. 11, 2001

(86) PCT No.: PCT/IB01/00604

§ 371 (c)(1),
(2), (4) Date: Oct. 17, 2002

(87) PCT Pub. No.: WO01/80563

PCT Pub. Date: Oct. 25, 2001

(65) Prior Publication Data

US 2003/0138101 A1 Jul. 24, 2003

(30) Foreign Application Priority Data

Apr. 17, 2000 (EP) .................................. 00810331
Jun. 15, 2000 (CH) .................................... 1179/00

(51) Int. Cl.
*H04N 7/16* (2006.01)
*H04L 9/00* (2006.01)

(52) U.S. Cl. ........................................ 380/231; 705/54
(58) Field of Classification Search .................. 726/7, 726/6; 380/231, 232, 233
See application file for complete search history.

(56) References Cited

U.S. PATENT DOCUMENTS 6,550,011 B1 * 4/2003 Sims, III ..................... 713/193
6,834,110 B1 * 12/2004 Marconcini et al. ........ 380/239
2003/0135464 A1 * 7/2003 Mourad et al. ............... 705/50

FOREIGN PATENT DOCUMENTS

| EP | 0 715 241 | 6/1996 |
|---|---|---|
| EP | 0 975 165 | 1/2000 |
| WO | WO 97/46017 | 12/1997 |

* cited by examiner

*Primary Examiner*—Matthew Smithers
(74) *Attorney, Agent, or Firm*—DLA Piper US LLP

(57) ABSTRACT

This invention concerns a system and a method of transmission and storage of audio/video data in encrypted form between a distribution centre and at least one exploitation module.

Instead of transmitting the information allowing the decryption in parallel to said data, these information are regrouped in a decryption data file comprising equally the data that define the access conditions to said audio/video data. This file is stored independently from said data and can be used for either an immediate use or a deferred one.

13 Claims, 1 Drawing Sheet

SECURE DATA TRANSMISSION SYSTEM AND METHOD

This invention concerns the field of data security, particularly data security during transport.

In a classical scheme of distribution, the generator of data, either audio/video information or a computer programme, transmits them to a distributor who is in charge of distributing them against payment.

According to a known scheme, the data are then unscrambled stored at the distributor, the latter having encryption means when distributing to the final consumer.

The data are normally channelled from the supplier to the distributor by a means such as a cable link or by sending a data support, for example a magnetic tape.

It has been proven that this transport presents an important risk of illegal copies, the clear data being easily subject to copying.

In the face of this, the supplier and the distributor have agreed that the transport of these data is only carried out after encryption said data.

This solution is satisfactory from the point of view of illegal deviation of these data during transport. Once the data have arrived securely they are stored on a video server for their distribution.

Nevertheless, the supplier, once the data have been transmitted to the distributor, loses control of his/her data, and ill-intentioned people can produce illicit copies from the video server.

The same problem appears when the distributor transmits these encrypted data to the final consumer who then has the means for decrypting them and therefore can have this unscrambled data available. Unauthorised copies can then be produced from the consumer.

Furthermore, the onset of encryption norms in the field of data transmission limits the security possibilities by imposing the used algorithms.

The aim of the present invention is to ensure the distribution of data amongst all the different intermediaries ensuring a control of the number of uses of these data.

This aim is achieved by a system of audio/video data transmission in encrypted form by a first type of encryption, said encrypted data being accompanied by a decryption data file, comprising the temporary decryption keys and the conditional access information, said file being encrypted by a second type of encryption.

In this way, the unit in charge of decryption the audio/video data, on the basis of the conditional access information, will determine if the user has the necessary rights.

The use of a second type of encryption allows reinforcing an encryption on a known system basis as it is imposed by a norm.

The System at the Subscriber Level.

In order to render the data transmissions inviolable, the transmitted flux comprises the data encrypted by control words CW as well as decryption information contained in a file named MT (Meta Data). The control words (CW) serve as decryption keys variable in time. This file of Meta Data contains on the one hand the decryption keys as control words CW and on the other hand a definition of the necessary rights for the decryption for either a subscription or the payment of a bill directly linked to this emission. This file is encrypted by an algorithm of the IDEA type whose security is superior to the algorithms used for the encryption with control words (CW).

On the subscriber's side there is a security module, usually in the form of a smart card containing the rights of the subscriber (his/her credit amongst others), and compares these rights to those required by the emission. If the rights allow it, the security module decodes the file of Meta Data and returns the control words CW that are necessary for the decryption of the data.

More and more subscriber installations comprise information storage units such as a hard disk. This allows reviewing a scene, to carry out a slow motion viewing without losing any of the distributed information during the reviewing.

These units are capable of storing a whole film for offering it for purchase to the subscriber. Such a download is done during the day, a period when traffic is smaller. If the subscriber accepts the purchase offer, he/she can view it whenever he/she wishes.

This procedure presents the inconvenience of having on a numerical support that is easily copied information whose control is desired. This is equally valid during software transmission. In fact, the subscriber's installation can be a computer to which is connected a security module and the download may represent for example a game programme.

According to the invention, the data are transmitted in encrypted form with a first type of encryption, accompanied by a file of control messages that are also encrypted by a distribution key according to a second type of encryption. In this file are equally included the conditional access information defining the rights to an immediate use and the rights associated to a deferred use.

The flux of data is stored in encrypted form in the subscriber's unit, this preventing any abusive use. Each subsequent use of the data needs the presence of the security module. The latter can then control the rights of a deferred use, for example to limit it in time, even authorising it only a certain number of times.

In the case where a certain number of uses is authorised, the control message comprises the identifier of the emission, the maximum number of uses as well as eventually a persistence indicator. During the first use the security module will initialise its own counter for this emission, which will be increased with every decryption by the security module. When the maximum is reached decryption will be prevented.

The persistence indicator allows the security module to know with what delay the counter of this emission will be able to be erased. In order not to fill the security module's memory with this information, when the date of this indicator is surpassed, the portion of memory assigned to this operation can be used again. It is advantageously labelled by day (1 to 250 days) starting from the first use.

The System at the Distributor Level.

The distributor has a gigantic storage unit that regroups all the emissions to be distributed. It is normally called video server. Certain emissions will be distributed once, such as televised information, while others will be distributed in loop during several days in order to be offered for purchase to the subscribers.

These emissions arrive in encrypted form accompanied by control messages encrypted by a first key of the supplier. These data are stored in the storage unit in encrypted form to prevent any leak or illegal copy.

When using these data the video server transmits the encrypted data for their distribution. These data are accompanied by the file with the decryption information sent by the video server to a security unit.

This unit carries out a decryption of this file in order to extract the control words CW and to verify the rights of use. Once this operation is finished the security module codes these control words adding new rights of use to them. These new rights are defined by the distributor and can comprise a condition for a subscription or can link the use to the purchase of the emission. It is at this stage that the number of uses or of viewing is defined.

This new file of decryption information is then transmitted with the flux of encrypted data.

BRIEF DESCRIPTION OF THE DRAWINGS

The invention will be better understood by means of the following detailed description which makes reference to the annexed drawings that are offered as a non-limiting example, where FIGS. 1 and 2 represent two embodiments of the invention.

The video server VS receives the data DT in the form of a tape according to our example, but said data can be transmitted by whatever known means of transmission. The decryption information file MD is equally supplied to the video server. This file is generally supplied at the same time, that is, it will advantageously be on the same tape as the encrypted data. Nevertheless, if we wish to reinforce security, it is possible to transmit the MD file by other means.

Once these two files are in the video server VS the system is ready for distribution.

At this moment the MD file is transmitted to the security module SM to add the rights we wish to define for this emission. The module decodes the MD file and then adds the information related to the necessary rights for the viewing and returns to the server VS this new MD file encrypted by a transport key.

The data DT as well as this new file are distributed to the different subscriber modules STB.

Because the decryption of the data DT cannot be done without the MD' file, the latter is generally sent previously.

Figure 1:
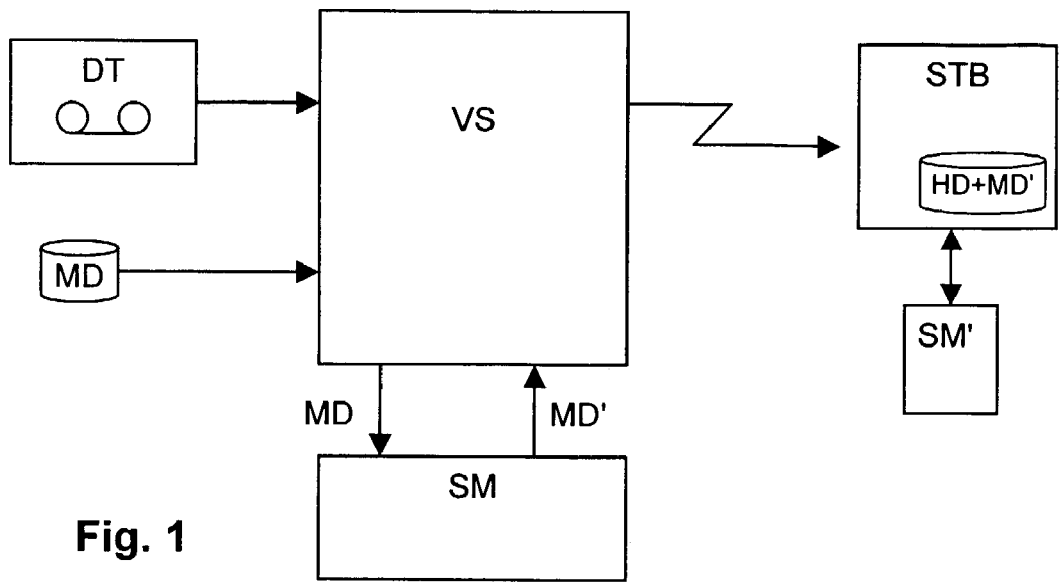
FIG. 1 is a block diagram of a distribution system according to one embodiment of the invention.

The data arriving to the decoder STB are either processed immediately or stored for later use in the HD unit. In the second case it is clear that the MD' file must equally be stored in the HD unit as illustrated in FIG. 1.

To obtain the unscrambled data this MD' file is presented to the security module of the subscriber SM' so it can decode said file and extract the control words CW.

Figure 2:
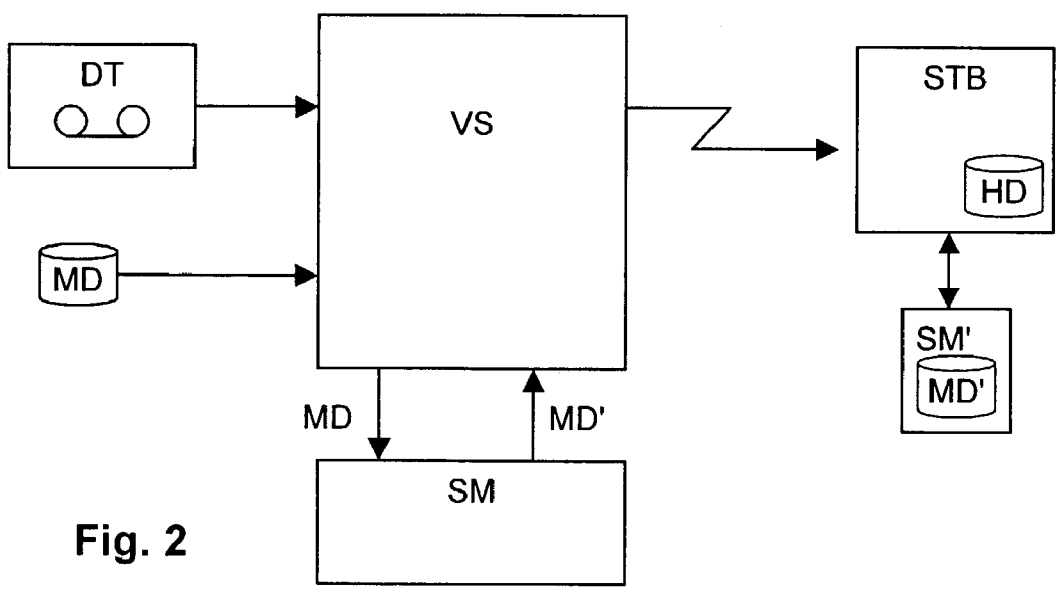
FIG. 2 is a block diagram of a distribution system according to a second embodiment of the invention.

According to an embodiment such as illustrated in FIG. 2 the MD' file is stored only in the security module of the subscriber SM'. In this way any attempt to seek the correlation between the content of the data and the MD' file is sure to fail.

In the frame of the invention we propose a pre-encryption module destined for producing the data DT in encrypted form. This module receives the unscrambled data and produces the couple encrypted data DT and the MD file.

According to the chosen security structure the DT file is encrypted according to a first encryption mode, the control words CW serving as decryption keys. It is preferably a symmetric mode due to the speed required for processing. These control words CW are also encrypted according to a second encryption mode, for example DES.

When grouping the whole of the control words in an MD file, the encryption of this file is of a third type of high encryption level, for example IDEA. In fact, the consequences of a successful attack on this file would be much more serious than on a control word.

The invention claimed is:

1. A system for managing access to content encrypted with at least one control word, the system comprising:

a memory; and a processor connected to the memory, wherein the processor is configured to perform the steps of:

decrypting a file associated with the content and stored in the memory, the file comprising at least one control word used to encrypt the content and at least one first access condition for using the content, the first access condition being defined by a provider of the content;

verifying that the first access condition is satisfied;

adding a second access condition for using the content to the file, the second access condition being defined by a distributor of the content; and re-encrypting the file.

2. The system of claim 1, wherein the second access condition comprises a first section defining a condition for immediate use of the content and a second section defining a condition for deferred use of the content.

3. The system of claim 2 wherein the second section comprises a necessary subscription type.

4. The system of claim 2, wherein the second section comprises a price for use of the content.

5. The system of claim 2, wherein the second section comprises a maximum number of uses.

6. The system of claim 1, wherein the memory and the processor form part of a video server supplied with a security module, the processor being located in the security module.

7. The system of claim 1, wherein the content is also stored in the memory.

8. The system of claim 7, wherein the content and the file are stored as separate files.

9. A method for managing access to content encrypted by at least one control word comprising the following steps:

encrypting content data with encryption keys that vary with time in a first location corresponding to a provider of the data;

encrypting a file associated with the content, the file configured to include the encryption keys and at least one first access condition corresponding to the content data, the first access condition being defined by a provider of the content data;

transmitting and storing the content data independently of the file;

determining when the content data are used by a distributor, and transmitting the file to a control module when the content data are used by a distributor;

decrypting the file in accordance with the first access condition at the control module;

adding at least one second access condition defined by the distributor to the file and re-encrypting the tile.

10. The method of claim 9, wherein the second access condition comprises a first section defining a condition for immediate use of the content and a second section defining a condition for deferred use of the content.

11. The method of claim 10, wherein the second section comprises a necessary subscription type.

12. The method of claim 10, wherein the second section comprises a price for use of the content.

13. The method of claim 10, wherein the second section comprises a maximum number of uses.

* * * * *